(12) United States Patent
Dobbins et al.

(10) Patent No.: US 11,552,934 B2
(45) Date of Patent: Jan. 10, 2023

(54) DEVICES, METHODS AND SYSTEMS TO AUGMENT THE SECURITY ENVIRONMENT OF INTERNET-CAPABLE CONSUMER DEVICES

(71) Applicant: DTS IOT B.V., Laren (NL)

(72) Inventors: Kevin Wendell Dobbins, Almere (NL); Scott MacDonald Ward, Laren (NL)

(73) Assignee: DTS IOT B.V., Laren (NL)

( * ) Notice: Subject to any disclaimer, the term of this patent is extended or adjusted under 35 U.S.C. 154(b) by 93 days.

(21) Appl. No.: 16/955,252

(22) PCT Filed: Dec. 11, 2018

(86) PCT No.: PCT/EP2018/084279
§ 371 (c)(1),
(2) Date: Jun. 18, 2020

(87) PCT Pub. No.: WO2019/121136
PCT Pub. Date: Jun. 27, 2019

(65) Prior Publication Data
US 2020/0396211 A1 Dec. 17, 2020

(30) Foreign Application Priority Data
Dec. 20, 2017 (EP) ..................................... 17208858

(51) Int. Cl.
*H04L 9/40* (2022.01)
*H04L 9/06* (2006.01)
(Continued)

(52) U.S. Cl.
CPC ........ *H04L 63/0428* (2013.01); *H04L 9/0643* (2013.01); *H04L 9/0869* (2013.01);
(Continued)

(58) Field of Classification Search
None
See application file for complete search history.

(56) References Cited

U.S. PATENT DOCUMENTS

2007/0261103 A1 11/2007 Viavant et al.
2017/0005820 A1 1/2017 Zimmerman et al.
(Continued)

FOREIGN PATENT DOCUMENTS

| EP | 2 120 176 | 11/2009 |
|---|---|---|
| WO | 2004/111752 | 12/2004 |
| WO | 2017/171204 | 10/2017 |

OTHER PUBLICATIONS

Bennet Yee, "Using Secure Coprocessors", Thesis Submitted to the School of Computer Science for the Degree of Doctor of Philosophy, May 1, 1994, 48 pages.
(Continued)

*Primary Examiner* — Brandon Hoffman
(74) *Attorney, Agent, or Firm* — Nixon & Vanderhye, P.C.

(57) ABSTRACT

The application discloses an electronic operating device (100) arranged to protect communication between a consumer application (125) and a network-connected consumer device (300). The operating device protects a command message by signing the command message with a private key obtained from a key storage of the operating device (optionally also encrypting the command message with an encryption key), and sends the protected command message to the network controller (200). The network controller performs the verification of the signature of the command message such that legacy consumer devices without cryptographic capability can be used. The signature ensures that only authorised devices (100) can send commands to the consumer device (300).

18 Claims, 6 Drawing Sheets

(51) Int. Cl.
    *H04L 9/08*          (2006.01)
    *H04L 9/32*          (2006.01)
    *H04L 67/125*      (2022.01)

(52) U.S. Cl.
    CPC .......... *H04L 9/0894* (2013.01); *H04L 9/3247* (2013.01); *H04L 67/125* (2013.01)

(56) References Cited

U.S. PATENT DOCUMENTS

| | | | |
|---|---|---|---|
| 2017/0063999 A1* | 3/2017 | Adrangi | H04W 12/037 |
| 2017/0147807 A1* | 5/2017 | Rooyakkers | H04L 9/083 |
| 2017/0289184 A1 | 10/2017 | C et al. | |

OTHER PUBLICATIONS

International Search Report and Written Opinion of the ISA for PCT/EP2018/084279 dated Mar. 19, 2019, 16 pages.

Teschke, F., *Hardening Applications with Intel SGX*, Master's Thesis, Hasso-Plattner-Institut at the University of Potsdam, Jul. 17, 2017.

\* cited by examiner

DEVICES, METHODS AND SYSTEMS TO AUGMENT THE SECURITY ENVIRONMENT OF INTERNET-CAPABLE CONSUMER DEVICES

This application is the U.S. national phase of International Application No. PCT/EP2018/084279 filed Dec. 11, 2018 which designated the U.S. and claims priority to EP Patent Application No. 17208858.5 filed Dec. 20, 2017, the entire contents of each of which are hereby incorporated by reference.

FIELD OF THE INVENTION

The invention relates to an operating device, a network controller, a protection method, a network method, and a computer readable medium.

BACKGROUND

Increasingly, consumer devices and other devices relating to consumer usage of products and services are becoming directly connected to the Internet by implementing standard Internet protocol suites, such as the Transmission Control Protocol ("TCP"), and/or Internet Protocol ("IP"), or they may be configured to establish or participate in other communication channels including Internet gateways (e.g. a mesh network for utilities services with indirect Internet access through a neighborhood Internet gateway), Wi-Fi networks and indirect communications protocol suites including but not limited to wired, or wireless home area network ("HAN") technologies, where the HAN often is referred to as the "private IoT network". A HAN connects in-home digital devices into a common network. The HAN can be used for intra-network connectivity but regularly includes connectivity to the internet (e.g. for but not limited to user based web browsing) and access to internet hosted services. A HAN is also referred to as a local network, or a home area network.

Commonly, the environment of connected Internet capable devices is denominated as "Internet of Things" (hereinafter "IoT"), where in the sense of Internet capable consumer devices "things" (hereinafter "IoT device", or "IoT devices") may refer to all thinkable kinds of consumer devices, including but not limited to thermostats, alarm security systems, sensors, actuators, medical devices, household appliances, Smart TV's, ordinary consumer electronics, utility meters, mobile phones, personal computers and tablets. IoT devices may sense, receive, or transmit data or information as well as communicate with other devices, networks or computers, where each IoT device in a private IoT network may be uniquely designated by an identifier, such as identification code or a digital address.

SUMMARY OF THE INVENTION

An electronic operating device is provided as defined in the claims. The operating device is arranged to protect communication between a consumer application and a network-connected consumer device. The operating device supports the consumer application, which may be used to send command messages to the network-connected consumer device. For example, the operating device may be a mobile phone, and the network-connected consumer device may be, say, a home automation application, e.g., a thermostat, a lighting controller, or the like. Through the consumer application, the user may, e.g., be able to control the network-connected consumer device. Network-connected consumer device are also referred to as IoT devices.

Conventional protection for the communication between the consumer application and the network-connected consumer device has been found to be lacking.

In embodiments, computer program instructions are stored on a memory of the operating device. Part of the instructions, the consumer application part, implement the consumer application. Part of the instructions, the protective part, implement a protective application. The protective part of the instructions is also referred to as the protective application or the authentication software.

For example, the protective application may be arranged to protect a command message by signing the command message with a private key obtained from a key storage of the operating device, and to send the protected command message to the network controller. The network controller is arranged to verify the protection of the protected command message and to forward the protected command message to the network-connected consumer device. By blocking command messages that are not signed by the operating device attacks on the system are avoided. The protective application may be arranged to provide additional protection by encrypting the command message, e.g., with an encryption key, e.g., a public key of the network controller or the network-connected consumer device.

The operating device has several advantages. For example, the network controller has increased assurance that the command message arrived from the operating device rather than from an intruder in the system, e.g., an attacker. On the other hand, the overhead for the consumer application is very small. Even if development of the consumer application proceeded almost without regard to security considerations, protection of the command message would still be assured so long as the command message is passed by the protective part before sending it to the network controller. By contrast security measures in the protective part can be high. For example, the protective part may have a part that runs in privileged mode, and one that does not. Countermeasures can be taken against tampering, e.g., modification of the software, or unauthorized use of a key used by the protective part.

The operating device, network controller and network-connected consumer device are each electronic devices. The operating device may be a mobile electronic device, e.g., a mobile phone, tablet, laptop or the like. The network controller may be a router, a modem, a gateway, a set-top box, a computer, etc.

An aspect of the invention concerns a network controller for use with an operating device. The network controller may ensure that communication with certain devices, e.g., with some or all network-connected consumer devices comes from the expected operating device. In an embodiment, a system comprises a network controller, an operating device and a network-connected consumer device.

An aspect of the invention concerns a protection method and a network method. A method according to the invention may for instance be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store, Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings, FIG. 1a schematically shows an example of an embodiment of a consumer application system, FIG. 1b schematically shows an example of an embodiment of a consumer application system, FIG. 2 schematically shows an example of an embodiment of a memory, FIG. 3 schematically shows an example of an embodiment of a network controller, FIG. 4 schematically shows an example of an embodiment of a protection method, FIG. 5 schematically shows an example of an embodiment of a network method, FIG. 6a schematically shows a computer readable medium having a writable part comprising a computer program according to an embodiment, FIG. 6b schematically shows a representation of a processor system according to an embodiment.

LIST OF REFERENCE NUMERALS IN FIGS. 1-3, 6A, 6B 100 an operating device
100.1, 100.2 an operating device
101 a consumer application system
102 a home area network
110 a communication interface
111 a computer network
112 an external server
121 a user mode part
122 a privileged mode part
125 a consumer application unit
125.1, 125.2 a consumer application unit
141 a first protective unit
142 a second protective unit
143 a program verification unit
144 a key construction unit
145 a signing unit
150 a memory
151 a first part of the memory
152 a second part of the memory
153 consumer application instructions
154 first protective instructions
155 second protective instructions
160 a key storage
161 multiple key parts
162-164 a key part
165 a system metric source
200, 201 a network controller
210 a communication interface
240 an authentication unit
250 a signing unit
260 a traffic profiler
262 a traffic profiler storage
270 a password generator
272 a password storage
300 a network-connected consumer device
300.1-300.3 a network-connected consumer device
310 a communication interface
1000 a computer readable medium
1010 a writable part
1020 a computer program
1110 integrated circuit(s)
1120 a processing unit
1122 a memory
1124 a dedicated integrated circuit
1126 a communication element
1130 an interconnect
1140 a processor system

DETAILED DESCRIPTION OF PREFERRED EMBODIMENTS

Figure 1A:
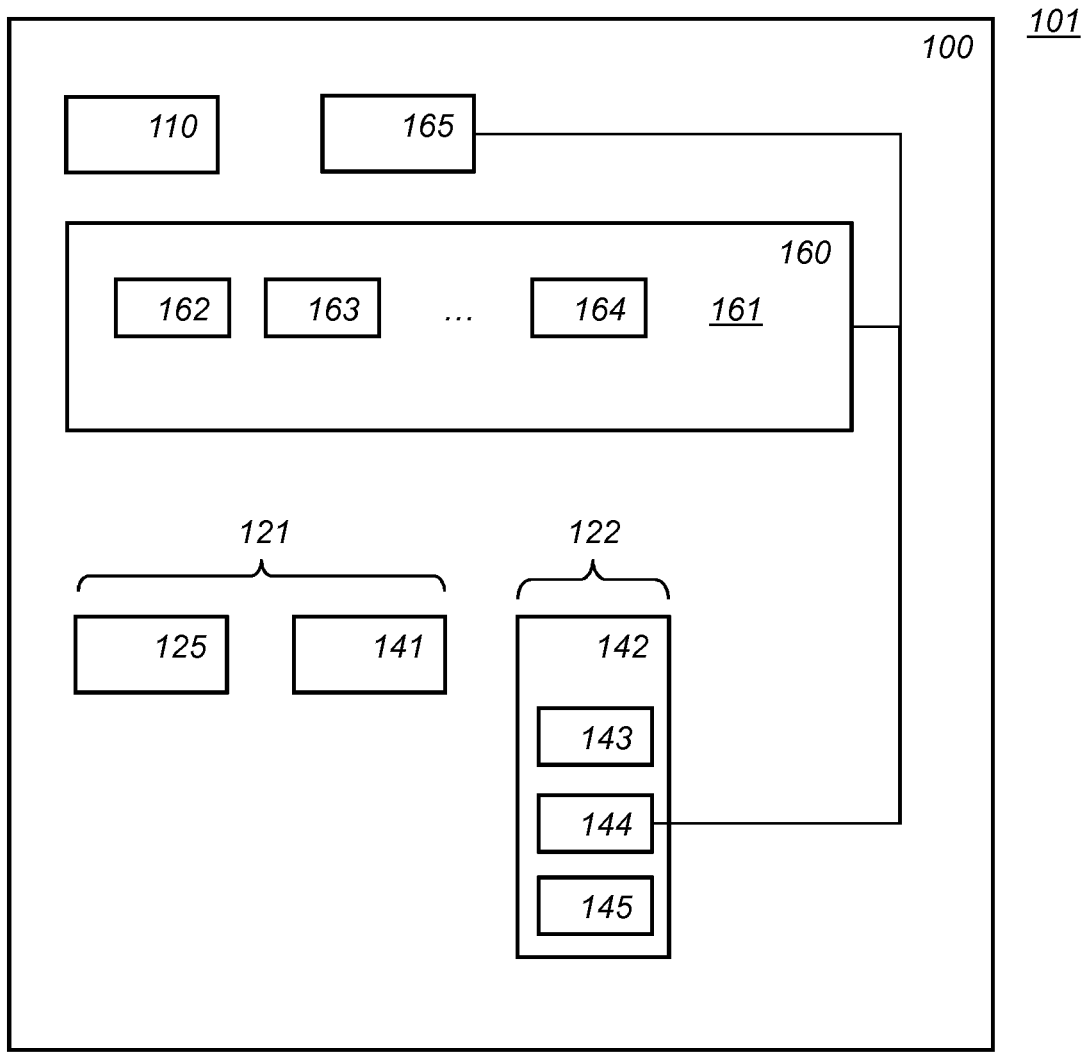
Figure 1A:
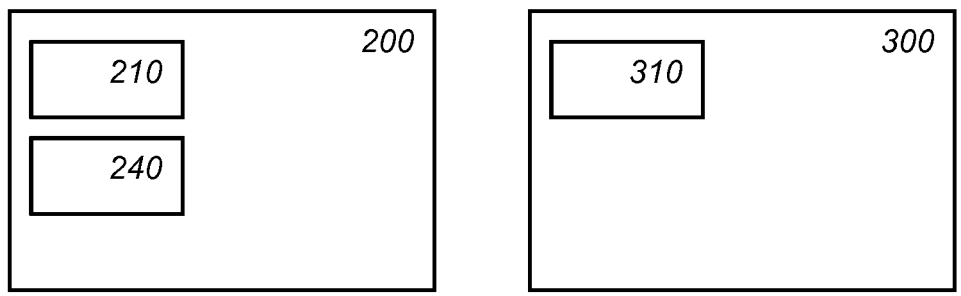

This invention is susceptible of embodiment in many different forms. One or more specific embodiments are shown in the drawings and will herein be described in detail, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments described herein, and the invention lies in each and every novel feature or combination of features described herein or recited in mutually different dependent claims.

Technology is headed toward mass deployment of the IoT with the goal of transforming our daily lives via efficient, interconnected communications and data transfers. Already, more than a quarter of consumers in the United States own some kind of in-home smart device. According to research firm Gartner, a staggering 20.8 billion 'things' could be connected to the internet by 2020, a considerable proportion of which will be IoT devices, directly or indirectly connected to the Internet. With this sheer volume of internet-connected devices, IoT represents a huge attack surface for hackers exploiting all sorts of security vulnerabilities and seeking to monetize IoT attacks in the same way they monetize traditional computer and mobile phone botnets. Hackers have in the meantime aggregated hundreds of thousands to millions of user devices into their rogue botnets to accomplish malicious missions. IoT devices already are being used to conduct massive distributed denial-of-service attacks ('DDoS attacks'). Hackers accomplish this, e.g., by using specially designed botnets to penetrate predefined malware vulnerable IoT devices, disable (other) remote admin log-on methods (SSH, HTTP, etc.), and connect the IoT devices to their command-and-control servers to distribute next instructions and attack targets.

Worse, with IoT devices, vulnerabilities can have consequences far beyond the digital realm. The expected coming wave of IoT attacks include those that could form a direct threat to the protection of privacy or abuse of sensitive information that could support and enable unlawful entry into consumer homes and other properties and that could pose a threat to consumer health. Hackers have long known they can disrupt nearly any medical device that has writeable software, works wirelessly, or connects to the Internet. There have been hundreds of recalls for medical devices in the past decade, a large percentage of which are due to cybersecurity issues.

Also, IoT attacks could involve the so-called bricking of IoT devices, whereby such device becomes so maligned that it will not operate without at least a new firmware write. Or they could be aimed at distribution of doxware, which will lock, e.g., a mobile phone or computer, at which time the hacker will threaten to release, e.g., precious or confidential documents to the world.

Generally, private IoT networks, Internet gateways and Wi-Fi connections lack secure login mechanisms, do not check the authenticity of applications and other software deployed to access, command and/or otherwise run software installed in IoT devices, do not protect the confidentiality and integrity of data in transit to, traversing or leaving said network, and do not manage the authorized type of content exchange to and from IoT devices and from an IoT device onward from the IoT network.

Some embodiments relate to enhanced security methods and systems for user, data and device management relative to Internet capable consumer devices connected in an IoT network. More specifically to ensuring the authentication, verification and/or authorization of the user, monitoring unwilled or unlawful alteration or addition of software applications in IoT devices, providing for the confidentiality of data traversing an IoT network, and managing aspects and/or providing integrity of data and/or digital information transmitted from said network to other devices, networks or services in distinct stages of the use or operation of IoT devices.

In said methods and systems at least the following stages can be distinguished, e.g., a stage wherein a user operates an operating device, e.g., a mobile phone, tablet, personal computing device, (remote) controller or any other electronic device acting as command center and/or management platform and capable of communicating with a network controller connecting the IoT network to an external network, e.g., the internet, to the IoT network itself and/or to IoT devices thereon. Thus, the user may send commands and/or instructions from the operating device to the network controller. Another stage is wherein the user subsequently operates, instructs, commands or otherwise runs software installed in one or more IoT devices, a further stage is wherein any IoT device acts correspondingly, may generate responsive digital interaction of any nature including but not limited to generating or sharing digital data or information and/or a stage wherein digital data and/or information is transmitted on the IoT network or from said network to other networks, e.g., the Internet. It is foreseen that in some embodiments, fewer than the above four stages may be applicable, for instance when a user directly connects a device such as a smartphone to the internet through the IoT network, or when an IoT device responds to a (re)quest from an Internet gateway.

International patent application PCT/NL2004/000422, published as WO2004/111752A2, and included herein by reference, provides methods and systems for performing an electronic transaction. At least one disclosed method comprises providing authentication data in a memory of an electronic device, wherein said authentication data are inaccessible to a user of said electronic device, wherein the authentication data are encrypted using at least one encryption layer, each said encryption key also being inaccessible by said user; providing authentication software in said electronic device, the authentication data being accessible to said authentication software and activating the authentication software to generate a digital signature. Embodiments of said Patent Application describe and disclose various installation methods for both new and existing electronic devices. Also, said Patent Application discloses that said memory may be inaccessible to an operating system of the electronic device, that the authentication data may be stored in a secure storage location of a secure area of said electronic device, that the authentication software is installed in an application environment in the secure area such that it may obtain the authentication data without passing through an unsecured part of said electronic device and that the authentication data may be encrypted with an encryption key which is associated with a hardware device serial number, and/or respectively associated with a user identifying number such as a PIN, or a number or a template associated with a fingerprint of the user, or the like.

The patent application further explains that authentication data may both become unreachable for the operating system of the device and inaccessible by the user and that the authentication software provided may be stored in a secure area of the device, wherein the authentication software is not reported to the operating system of the electronic device.

Some embodiments obtain diversity of the lay-outs of the authentication software by means of randomization. This build of randomized code lay-out may take place on a build server, from where the user may download said authentication software on an operating device and subsequently install it on an operating device. Preferably each authentication software package carries its own software ID. Having a unique identifier in the authentication code, enables the unique identification of the operating device and can act as an index in databases, e.g., in order to retrieve a specific public key.

Thus, in an embodiment, there is no universal or homogenous base of authentication software installations in the field. This impedes the development of a single targeted attack and forces hackers to subvert each device one at a time. The authentication software may also be downloaded by the user from a server operated by a mobile telephone operator ("MTO"), by an Internet Service Provider ("ISP") or a Cloud Service Provider ("CSP")

In order to safeguard against unwilled or unlawful alteration or addition of software or software components, measures may be taken to mitigate the risk of penetration and/or undetected modification of software. Put differently, and where applicable, only software that is in its original state should be allowed to be called and run. In a preferred embodiment, this can be achieved by applying caller code digesting ("CCD") routines. With CCD, the owner/issuer of software digitally signs the hash value of the code, or part thereof, with a private key prior to distribution. In a following instance where any code in an embodiment is called by another program or application, the called software locates said digital signature of the caller code, recalculates the hash value of the caller code by use of the same hashing algorithm embedded in its code, decrypts the digitally signed hash value of the caller code with the public key of said owner/issuer which is embedded in the called software and compares the recalculated hash value with the digitally signed hash value. The hash value of the caller code may be obtained from various sources. For example, the hash value may be received from the calling application. For example, the verifying software may comprise a hash value storage in which one or more hash values are stored. The same type of protection may be used to store the hash values as may be done for keys.

Only when in the CCD routine both said hash values are identical the call by the other program will be accepted. Thus, the integrity of the various software program codes and/or application codes in the 'chain of trust' at the point of operation in the operation device can be established and sustained. Only calls from untampered and thus trustworthy software code will be accepted. The CCD function may be installed in electronic devices capable of providing instructions or commands, in electronic devices receiving said instructions or commands on the HAN in first instance, e.g., a network controller, and/or in IoT devices, etc. The CCD function is also applicable where different software components related to an embodiment reside on a given electronic device. For example, an operating device may have an installed browser plug-in, a user application to manage and/or control IoT devices on the HAN and authentication software, where the authentication software is inaccessible by the user or any user operated software, or said authentication software is unreachable by the operating software of the operating device. In the given example, any call between said different software components will only be accepted after the successful completion of the CCD function.

In an embodiment, the CCD function may incorporate protection against brute force attacks, e.g., after one or a small number of unsuccessful signature validations or incorrect hash comparisons, it may directly go in to an outright blocking mode, may impose a significant time delay in further validation of presented digital signatures, and may instigate a warning communication, e.g., on the private desktop (see below) of the operating device. In the event of said blocking mode, the authentication software may only be un-blocked by special means. Such special means could resemble the way SIM chips of mobile phones are unblocked by provisioning of a so-called PUK code, which has been communicated out of band to the user or is to be retrieved from a special source, e.g., the provider of the authentication software.

The first protective part may be configured to display a private desktop to a user of the operating device. Some embodiments counter what is known by persons skilled in the art as screen overlaying, e.g., a circumstance whereby malicious users trick bona fide users in to providing sensitive information such as authentication credentials, social security numbers etc., or disclosing other sorts of—mostly—private information, or electronic transaction details in a screen, where said screen is overlaying or 'put in front' of the legitimate screen. In a preferred embodiment, this may be achieved by the introduction of an additional private desktop. For instance, Microsoft Windows carries three default desktops: Winlogon for the logon screen and UAC, the screensaver and the regular user desktop. Leveraging the exemplary Windows 'Desktop component' a forth, distinct private desktop is created. This desktop is securely separated from the other desktops and is not accessible from applications in the regular user desktop. Using security descriptors, the private desktop is separated from all other user processes in, e.g., Windows. All sensitive and/or confidential information sent back and forth is presented in the private desktop and any data, e.g., authentication or credential data, is entered or fed there. In comparison, compromising this private desktop would be as hard as viewing running applications behind a login screen without logging in. In the private desktop the user may set up profiles including a range of commands in the form of a structure of codes, or otherwise per the various IoT devices it may wish to command and/or manage. Furthermore, encrypted messages received by the installed authentication software may be decrypted and displayed in clear text in the private desktop after decryption. Encryption may be based on symmetric encryption, or on asymmetric encryption when the authentication software contains the public key corresponding to the private key with which the data was encrypted.

For example, the first protective part may be configured to use a private desktop to authenticate a user of the operating device, or to facilitate the input of digital data, e.g., before calling the second protective part. For example, the private desktop may be arranged to receive a password or a biometric, etc., from the user which may be verified by the first part. This provides additional protection against, e.g., malicious keylogger programs, Remote Access Trojans, and the like.

In the event of setting up and enrolling an existing operating device one or more asymmetric key pairs are generated as part of the authentication software installation process. This can be accomplished by proven and approved means and standardized algorithms, e.g., a random bit string generator and a key generating algorithm. The random bit string generator, or any other number generating algorithm for that matter may also be utilized to generate a transaction random in the process of creating a command or instruction which, as will be further explained below, may function as a defense layer against malicious replay of a command, or instruction. Also as part of said installation process, the user may select and apply a username/password (or PIN) combination, or provide a biometric template as may be the case.

In a further embodiment, possibly as alternative to securing memory locations or in addition thereto, during the software installation, the private key of the generated asymmetric key pair may be protected by a key splitting and binding mechanism ("KSB") in the authentication software. The KSB may be randomly arranged on each electronic device. In a KSB, the private key is split in multiple parts, wherein these multiple parts are encrypted by an encryption key created in the authentication software, such that is bound to specific device metrics as detected by or computed in said installed authentication software. The KSB may also be applied to any other encryption key residing in the operating device.

By consequence, only the specific instance of the authentication software installed on a particular electronic device is capable of reassembling the encrypted parts of the private key in the correct order and decrypting said parts with the decryption key corresponding to the device metrics of the electronic device in order to arrive at the private key. Therefore, authentication software that is copied over to another device is rendered useless as there will be no match of the device metrics between both devices, e.g., no decryption of the reassembled private key, or any other encryption key will be achievable. The same is applicable to user credentials applied in any other private desktop and thus provided to authentication software not residing on the operating device it was originally installed on.

In addition to the generation of said asymmetric key pair, the authentication software may have a public key of the issuer embedded therein, and in addition thereto any other form of a symmetric encryption key together with the appropriate algorithm to encrypt or decrypt data on the operating device. Further, the authentication software may contain, hold or store other public keys provided to the authentication software under the protection of the CCD routines, e.g., public keys from other parties such as OEM's of IoT devices, or service providers of any kind.

As will be further disclosed below, the authentication software ensures protected communication to, from and between IoT devices. This may be achieved by providing a secure method of authentication followed by an authorization process that may be based on access policies. The home area network (HAN), i.e., the local network, may comprise a network controller. The network controller is arranged to digitally communicate with the operating device and with the network-connected consumer devices over the local network. For example, the network controller may receive digital message from the operating device and forward the digital message to a network-connected consumer device, or vice versa. In a typical home area network, all messages, in particular all messages of the operating device and of the network-connected consumer devices, pass through the network controller.

A particular important example of a network controller is a Personal Internet Gateway Device ("PIGD"). Commonly, a HAN is connected to the Internet via a network controller in the form of a (high-speed broadband) modem which acts as a PIGD. A PIGD may also include the functionality of a wired or wireless router.

In an embodiment, the network controller, e.g., a PIGD, contains a bootloader, wherein the bootloader's main function may be to initialize the hardware, pass an abstraction of the initialized hardware, e.g., a hardware description, to the kernel and execute the kernel of the network controller.

Further, the network controller may have an interface to its public IP address, and may perform DHCP functionality and provide external DNS services. The normal process of IP packet filtering and forwarding is the primary function of the network controller and standard firewalling techniques may be incorporated as deployed by the ISP. Such firewalling may for instance reduce the ability to scan ports on the network controller and/or of devices on the internal (HAN) network and prevent replies to port scans.

In a preferred embodiment, a mirroring authentication software component to that of the operating device may be installed in the network controller, implemented in the BOOT phase and loaded in to the bootloader, in any case prior to the (actual) boot of the operating system of the network controller. Said authentication software may run at the kernel level of the network controller.

In another embodiment, the network controller authentication software may be loaded in to certain hardware, provided this hardware is inaccessible by any software in said network controller running at a higher than kernel level, such as an application layer or layer 3 level and/or is unreachable by the operating software of said network controller.

Like with the authentication software of the operating device, the network controller authentication software may contain algorithms to generate a one-time random, to generate an asymmetric key pair, and also algorithms to encrypt and/or decrypt data, perform hashing operations and verify digital signatures. The network controller authentication software component may also have the public key of its issuer (e.g. the ISP) embedded therein and may further contain any other symmetric encryption key, for instance one equal to said symmetric key contained in the authentication software of the operating device. Like with the operating device authentication software, software code lay-out randomization, and the functionality of caller code digesting and key splitting and binding as set out above may be made applicable to the network controller authentication software.

As recognized by persons skilled in the art, weak network controller passwords or passwords left at factory settings form a serious security threat. In an embodiment, this threat may be overcome, even mitigated by activating the one-time random generating algorithm to produce a large random bit string and taking this bit string in full or in part to reset the network controller password. This reset password may then be encrypted with the symmetric key or the private network controller key and shared with operating devices, where it can be retrieved and decrypted when necessary. Also, the encrypted reset password may be shared with another party, e.g., the issuer of the network controller, thereby creating a fall back option to regain the reset password at any time.

In a further preferred embodiment, the network controller authentication software may also contain intelligence to build and maintain a registry of operating devices with corresponding public key components as explained below, identify active applications and services of connected IoT devices and create an access-list based on this discovery.

This may be understood from the following high level example. A baby camera is associated with a HAN. The baby camera receives an IP address from the network controller and has the capability to send TCP/IP traffic. The network controller is the gateway to the internet and the authentication software on the network controller has intelligence to recognize illegitimate commands that could be used to allow the baby camera to join a botnet or contribute to a DDoS attack. The network controller authentication software intelligence has recognized the baby camera and through said traffic profile filters the type of traffic that is expected to be sent from this IoT device, including but not limited to the format of said traffic and the port or ports an IoT device should utilize in a regular mode of operation. In the event the traffic sent does not match the traffic pattern profile, the network controller authentication software may perform a blocking activity to prevent the traffic from leaving the HAN and entering the internet. In addition, a notification either encrypted or in the clear may be sent to the operating device, and or the servers of ISP's, CSP's or MTO's, that the activity transpired and requires investigation.

With the previously described security layers in place as may be applicable after installing the respective authentication software at both ends, e.g., on the operating device and the network controller, the operating device may generate the asymmetric key pair during the installation process, encrypt the public key component thereof with the symmetric key embedded in the authentication software and exchange said encrypted public key with the network controller authentication software by transmission, wherein subsequently said public key is decrypted and stored. Such storage may be in the clear, or it may be protected with the KSB of the network controller authentication software. Vice versa, the network controller authentication software may take identical steps to exchange its public key with the authentication software of the operating device. Consequently, both specific instances of authentication software installations have exchanged their public key components in a protected manner and can now safely encrypt and decrypt messages and data based on asymmetric encryption between them as well as digitally sign and verify digitally signed transmissions in either direction.

Different categories of IoT devices may reside on the HAN and their digital behavior and interaction may be profiled, monitored and managed accordingly by said network controller intelligence related to the network controller authentication software. Said intelligence may build a status table or traffic pattern profile per registered IoT device and may filter any commands initiated to the HAN network. Further, it may contain flags or other indicators, e.g., that communications destined for an IoT device are encrypted and/or emanate from one or a range of software ID's or IP addresses. And even further, that traffic emanating from an IoT device is allowable at certain intervals only, or is restricted to certain ports of the IoT device, or only leaves the HAN encrypted.

By means of examples, certain IoT devices such as low end household appliances may be restricted to receiving commands or instructions in order to fulfill an operation and perhaps to merely reply with a basic digital confirmation thereof. Other IoT devices may commence sending TCP/IP traffic following the receipt and execution of the command or instruction, e.g., the baby camera in the above example. Another category of IoT devices may create TCP/IP traffic after specific interaction with a user wherein said traffic may be of a sensitive nature as is mostly the case with medical devices sharing data with third parties such as medical professionals, hospitals etc. Yet another category of IoT devices may be designed to perform critical functions, such as alarm systems, security cameras and electronic door locking systems. And yet another category of IoT devices may need more or less unrestricted internet access in order to operate in line with user expectations, such as mobile phones, tablets, laptops and desktops. Such devices may be installed according to said Patent Application to securely conduct electronic transactions, including those involving internet connectivity from the HAN.

On the other hand and based on the IoT device category, so-called horizontal or cross device communications on the HAN between IoT devices may need to be monitored and managed. For example, why would a basic household appliance such as a microwave need to communicate with a medical device or a security camera? What restrictions should be put in place and maintained? In an embodiment, said monitoring and management may be effectively realized by building the intelligence of the network controller authentication software such that the internal IP address is mapped to the physical MAC address of the IoT device (associated with an OEM) on the HAN. The intelligence would further provision certain rules that may prevent particular IoT devices from initiating certain traffic and/or commands to other IoT devices, and may filter outbound traffic by said IoT device, or flag said outbound traffic when it does not meet the default properties of said IoT device.

Now when an operating device is to issue a command or instruction to the network controller of the HAN or through a communication exchange with the network controller to an IoT device on the HAN, the user starts the authentication software and provides its authentication credentials, e.g., a user/password (or PIN) combination or a biometric template to and/or on the private desktop. Subsequently, the user selects the IoT device it wishes to command, e.g., from a presented list of said devices registered with the authentication software and presented in the private desktop. A further step may be to select the desired command, or instruction, e.g., in the form of a dropdown of possible commands applicable for said IoT device. In a further embodiment the presentation of selectable registered IoT devices and/or the availability of commands or instructions per IoT device may be parameterized in line with the user's authentication credentials.

The authentication software may then internally validate the applied user credentials and as the case may be validate the authorization of the individual user to issue said command or instruction, generate a transaction random and digitally sign the representation of the selected IoT device, the representation of the command or instruction and the transaction random with the private key of the authentication software. Following, the representations of the IoT device and of the command or instruction, the transaction random and the digital signature are encrypted, either with the symmetric encryption key or again with said private key and transmitted to the network controller of the HAN together with the authentication software ID in the clear. Thus, with all protection layers in place, there is no need to send user credentials back and forth between the authentication software components of the operational device and the network controller.

Note, that in some embodiments of the system, multiple users may initiate any of multiple commands, e.g., switching a burglar alarm on or off. This may be resolved by authorizing the user, e.g., from his PIN or biometrics. The transaction random prevents replay since a link is made between a signature and a specific instance of a command. The transaction random may be included in the signature.

In an embodiment, the protective part is arranged to generate a transaction random, e.g., the first or second part of the protective part, and to send the transaction random associated with the protected command message to the network controller. For example, a transaction random may be a random number, or a nonce, etc. The transaction random may be a random number that is generated for this transaction, and may be used for replay protection. For example, the second part of the protective application may comprise a random number generator, e.g., to generate a key. The random number generator may be re-used to generate transaction randoms.

An advantage of using transaction randoms over challenge-response protocols is that there is less lag. For example, the operating device may be far away from the network controller. It would be inconvenient if a message to a network-connected consumer device of the user necessarily included additional messages between the operating device and the network controller. Upon receipt of the transmission, the authentication software of the network controller applies the registry of operating devices, extracts the public key of the operating device, e.g., based on said software ID, from its internally created index and decrypts said transmission with either the symmetric key or the retrieved public key as the case may be. Following, the network controller authentication software verifies the presented digital signature with said public key and checks the log file to establish the first use of the transaction random. For example, the network controller may have a transaction random storage in which a number of recently used transaction randoms are stored, e.g., the last 1000 or the like. For example, the network controller may be configured to receive the transaction random associated with the protected command message. The network controller may comprise a transaction random unit configured to verify if a transaction random storage comprises the received transaction random, and if so to block the command message, and if not, add the transaction random to the transaction random storage. If the random storage becomes too large, old transaction randoms may be removed. For example, transaction randoms may be used together with a time stamp so that old messages can be blocked from replay based on the time stamp, and new replays can be blocked based on the transaction random. The transaction random may be stored in the transaction random storage together with the time stamp.

This way the command or instruction transmission is simultaneously protected from eavesdropping, replay and/or tampering, whilst the successful encryption/decryption and digital signature verification process may be considered a proof that only an authorized and validated user on a particular operating device with all utilized authentication software in its original state could have generated the command or instruction. The network controller now transfers the command or instruction to the specific IoT device for further processing or execution. Outbound communications and/or traffic generated by the IoT device and transferred to the network controller destined either for other IoT devices (so-called horizontal communication) on the HAN or for exchange over the Internet may be run against the network controller intelligence including but not limited to said registries, identifications of active applications and services, access lists, status tables, traffic profiling and/or the network controller authentication software. This may result in approval, restriction or blockage of (ongoing) communication or traffic on or from the HAN, or to encryption of such communication or traffic by the network controller authentication software with the symmetric encryption key or with its private key prior to onward transmission by the network controller.

In a further embodiment, the network controller generates an error message, or any kind of other warning notification in the event of a caused restriction or blockage and sends said warning, or notification to an appropriate destination, or destinations according to the network controller intelligence, e.g., an operating device, and/or the server of the ISP, the CSP or the MTO. The intention may be to trigger an alert that the IoT device is not behaving as expected, or may be infected with unwilled or unlawful alteration or addition of software application(s) in the IoT device. This alert may give cause to create an online software update of the IoT device, as described below or to advise the consumer to replace the IoT device altogether.

In another embodiment, an IoT device may involve an embedded or otherwise incorporated secure microprocessor, such as universal integrated circuit chips intended to store and process confidential data and cryptographic keys in mobile phones and on bankcards. Also such secure microprocessor may be in the form of what is commonly denominated as a System on Chip processor. In these cases the operating device sends a command or instruction to the network controller encrypted by the symmetric key, or by the public key of said secure microprocessor. The network controller transfers the encrypted data to the IoT device where it is decrypted and subsequently further processed at the level of the IoT device by its embedded software. The network controller may regard the encrypted data as a binary large object (blob). Reversely, data coming from the IoT device may be encrypted by the IoT device secure microprocessor, e.g., with the shared symmetric key or with its private key before it is handed over to the network controller. The network controller then runs the input from the IoT device against its intelligence and either decrypts the inbound encrypted blob, and subsequently re-encrypts the received now in the clear data with its private key before transmitting the re-encrypted data, or directly transmits the encrypted blob over the Internet or other public network to its intended destination.

For example, in an embodiment the protective part may be arranged to encrypt the command message. The encryption may be performed, e.g., with a public key of the network controller, a public key of the network-connected consumer device, i.e., the IoT device, or by a symmetric key shared with the network controller and/or the network-connected consumer device. If the encryption is done with a key for which the network-connected consumer device does not have a decryption key, then the network controller could perform the decryption, and optionally re-encrypt the message. Encryption increases the privacy of the message. For example, encryption may be employed for medical consumer devices. For example, the encryption may be done in the first or second part of the protective application. For example, if the encryption is done with a public key, then the first part may be used; for example, if the encryption is done with a symmetric key, then the second part may be used.

For example, in an embodiment the operating device may be arranged to encrypt the command message in such a way that the encrypted command message can be decrypted by the network controller. For example, the network controller may be configured to decrypt the encrypted command message. This may be implemented by providing access for the operating device to an encryption key and providing access for the network controller to a decryption key corresponding to the encryption key. If symmetric encryption is used, then the encryption key and the decryption key may be the same key. If asymmetric encryption is, then the encryption key and the decryption key may be different keys; For example, the encryption key may be a so-called public key, and the decryption key may be a so-called private key. Public and private key together form a so-called a key pair.

The protected command message may be protected because it has been signed. The protected command message may be protected because it has been encrypted. In an implementation, the protected command message is signed but not encrypted. In an implementation, the protected command message is encrypted but not signed. In an implementation, the protected command message is signed and encrypted. When the network controller processes a protected command message, then this may comprise, e.g., as a first step, the processing of the protection. For example, processing the protection may comprise verifying a signature and/or decrypting an encryption.

Messages that are received back from the network-connected consumer device at the operating device may also be encrypted, e.g., with a public key of the operating device or with a public key of the network controller, etc. In the latter case, the network controller may decrypt and optionally re-encrypt. In an embodiment, the operating device is arranged to generate a transaction random, and to protect it together with the command, e.g., together with the command message. For example, command message and transaction random may be encrypted together, this ensures the confidentiality of the transaction random. The command message and transaction random may also be signed together. The transaction random may be embedded in the command message, so that they may protected together, e.g., encrypted together, but this is not needed.

Another embodiment caters for the involvement of an online server, e.g., a server in the cloud, e.g., a CSP, which may provide a range of services. This may begin with randomizing the footprints of the operating device authentication software packages on behalf of the ISP on a build portion of the online server, organizing and maintaining the stack of said packages on the online server with individual software IDs, digitally signing the respective hash values either with its private key (in which case the corresponding public key component may be embedded in the basis of the operating device authentication software code), or with a private key of the ISP or issuer of the network controller and facilitating and registering the downloads of said packages against data associated with the operating device, e.g., to create an index file.

In turn, the online server may similarly organize and maintain the stack of network controller authentication software packages and facilitate downloads thereof to network controllers. These network controller authentication software packages may have the public key component of ISP/network controller issuer asymmetric key pair embedded in the basic code, and/or in the event the online server deploys its own asymmetric key pair, it may embed its public key component in said basic code, or may opt to transfer such public key, encrypted with the symmetric key to the network controller authentication software upon completion of the installation thereof on the individual network controller.

In the further event of an online server, e.g., a CSP, 'in the middle', e.g., sitting between operating devices and network controllers of the HANs, an online server is loaded with its version of authentication software, amongst others containing the mentioned symmetric key. With the online server in place, the operating device or the network controller upon installation of said download may encrypt its generated public key component with said symmetric key and transmit this encrypted message to the server, preferably together with its software ID. The server subsequently decrypts said public key and indexes and files it against data associated with the operating device or network controller and/or the software ID of the individual authentication package of the operating device or network controller.

When an operating device issues a command or instruction to the network controller, it may encrypt and digitally sign said commands and instructions and transfer these to the online server. The server authentication software now decrypts the inbound message with the symmetric key, retrieves the corresponding public key from the index file and verifies the digital signature provided to it.

For the online server to subsequently forward or transfer the command or instruction to the network controller for secure verification of the legitimacy it may sign the calculated hash value with its private key or with a private key it maintains for the ISP or network controller issuer and further encrypt the outbound message before transmitting it to the network controller, in order that the network controller authentication software is capable of decrypting the inbound message and verifying the digital signature, prior to transferring said command or instruction to the IoT device in question.

The online server is in a position to offer other services, e.g., to OEMs. This could relate to providing the OEMs with data concerning registered products, e.g., for warranty administration purposes. But also for secure and controlled distribution of software updates and patches to OEM products registered on any given HAN. In an embodiment this may be achieved by signing the hash value of the update or patch with e.g., its private key and as the case may be encrypting the complete message containing the software prior to its distribution transfer. Thus, the risk is reduced that a rogue or otherwise compromised updates and/or patches will penetrate the HAN and reach destined IoT devices.

More detailed and/or further embodiments are described with reference to the figures.

FIG. 1a schematically shows an example of an embodiment of a consumer application system 101. System 101 comprises an operating device 100, a network controller 200, and a network-connected consumer device 300.

The various devices of system 101 communicate with each other over a computer network. Typically, the computer network is a Wi-Fi network. For example, the network controller 200 may be a router, a hub, a gate-way device, e.g., internet gate-way, a PIGD, or the like. In an embodiment, network controller 200 is a modem, e.g., a glass fiber modem and/or a router. In an embodiment, network controller 200 maintains a public IP address of system 101.

For example, network controller 200 may route computer network messages from inside system 101 to outside system 101. For example, network controller 200 may forward message from a local computer network, e.g., a home network to the Internet. For example, operating device 100, a network controller 200, and a network-connected consumer device 300 may communicate between each other over Wi-Fi, and network controller 200 may communicate to devices outside of system 101, e.g., through a wired connection, e.g., through Ethernet, or the like.

The local computer network through which devices 100, 200 and 300 communicate may be a HAN, a LAN, a WLAN, etc. Typically, the computer network will be wireless, but this is not necessary; the computer network may be wholly or partly wired. For example, the computer network may comprise Ethernet connections. The wire-less network may be a Wi-Fi network, but other wireless technologies may also be used. For example, the computer network may comprise wireless connections, such as ZigBee and the like. The devices comprise a connection interface which is arranged to communicate with the other devices of system 101. The local computer network may only connect to another network, e.g., the internet through the network controller.

For example, the connection interface may comprise a connector, e.g., a wired connector, e.g., an Ethernet connector, or a wireless connector, e.g., an antenna, e.g., a Wi-Fi, antenna. For example, operating device 100, network controller 200, and network-connected consumer device 300 may comprise communication interface 110, 210 and 310 respectively. The computer network may comprise additional elements, which are not separately shown in figure 1a, e.g., a router, a hub, etc. Communication over the computer network may be in the form of digital messages.

In an embodiment, all communication between operating device 100 and network-connected consumer device 300 goes through network controller 200. For example, in an embodiment, network controller 200 is a Wi-Fi router. To send a message from operating device 100 to network-connected consumer device 300, or vice-versa, the message is first sent to network controller 200. Network controller 200 may then forward the message, possibly modifying the message before forwarding it. In an embodiment, the computer network is configured so that all messages of the operating device and of the network-connected consumer device pass through the network controller.

For example, communication interface 110 may be configured to communicate with communication interface 210, communication interface 210 may be configured to communicate with communication interface 310. Communication interface 110 and communication interface 310 may be configured to only communicate via network controller 200 and its communication interface 210. Network controller 200 may route messages to devices inside system 101, or to device outside system 101, as desired.

The execution of the operating device 100, network controller 200, and network-connected consumer device 300 is implemented in a processor circuit, examples of which are shown herein. FIG. 1a shows functional units that may be functional units of the processor circuit. For example, FIG. 1a may be used as a blueprint of a possible functional organization of the processor circuit. The processor circuit and memory is not shown separate from the units in FIG. 1a. For example, the functional units shown in FIG. 1a may be wholly or partially be implemented in computer instructions that are stored at each device, e.g., in an electronic memory of device 100, 200 and 300, and are executable by a processor, e.g., CPU and/or microprocessor, of the respective device. In hybrid embodiments, functional units are implemented partially in hardware, e.g., as coprocessors, e.g., crypto coprocessors, and partially in software stored and executed at the device. The processor circuit may be a smart chip, a system on chip, etc.

Thus computer program instructions may be stored on operating device 100. The computer program instructions may correspond to various pieces of software. For example, part of the computer program instructions may be of a consumer application, or of multiple consumer applications. For example, part of the computer program instructions may be of a protective application, i.e., authentication software, possibly in a first and second part. As usual, the various pieces of software implement units of the operating device, which are configured to perform various functions.

Operating device 100 is arranged to protect communication between a consumer application and network-connected consumer device 300. The consumer application implements a consumer application unit 125 in operating device 100.

For example, in an embodiment operating device 100 may be mobile phone. The consumer application may be software that is installed on operating device 100. For example, operating device 100 may be an app which is downloaded from an app-store. The consumer application may control the network-connected consumer device 300.

Network-connected consumer device 300 may perform some useful function, e.g., in home automation, but is also connected to the network. In particular, network-connected consumer device 300 may be connected to the internet, e.g., through network controller 200, e.g., to send or receive data. For example, the network-connected consumer device 300 may receive a software update, or may send sensor readings to a server, etc. For example, network-connected consumer device 300 may be a burglar alarm. For example, network-connected consumer device 300 may be a light controller.

For example, network-connected consumer device 300 may be a thermostat, sometimes called a smart thermostat. The consumer application may control the thermostat, e.g., to increase or decrease temperature, and the like. Network-connected consumer device 300 may send digital messages to operating device 100, in particular for the consumer application, e.g., in response to user interaction. Network-connected consumer device 300 may send digital messages to a server outside system 101, e.g., to report sensor readings.

In an embodiment, the communication between network controller and consumer device may be protected, e.g., for integrity and/or confidentiality, e.g., by signing and/or by encrypting. This is however not necessary. In an embodiment a legacy consumer device may be used. A legacy consumer device may not have the capacity to perform encryption and/or decryption functions and/or to validate and/or create signatures. For example, in an embodiment the network controller receives a signed and optionally encrypted command and executes the validation of the signature, and if needed the decryption; this may be done without involvement of the consumer device. The network controller then sends the command to the network consumer device, e.g., to a legacy network consumer device. Even though the legacy network consumer device may not be capable to encrypt or decrypt traffic, etc., the network controller takes over this responsibility, at least for part of the traffic involved in controlling the network consumer device.

Figure 1B:
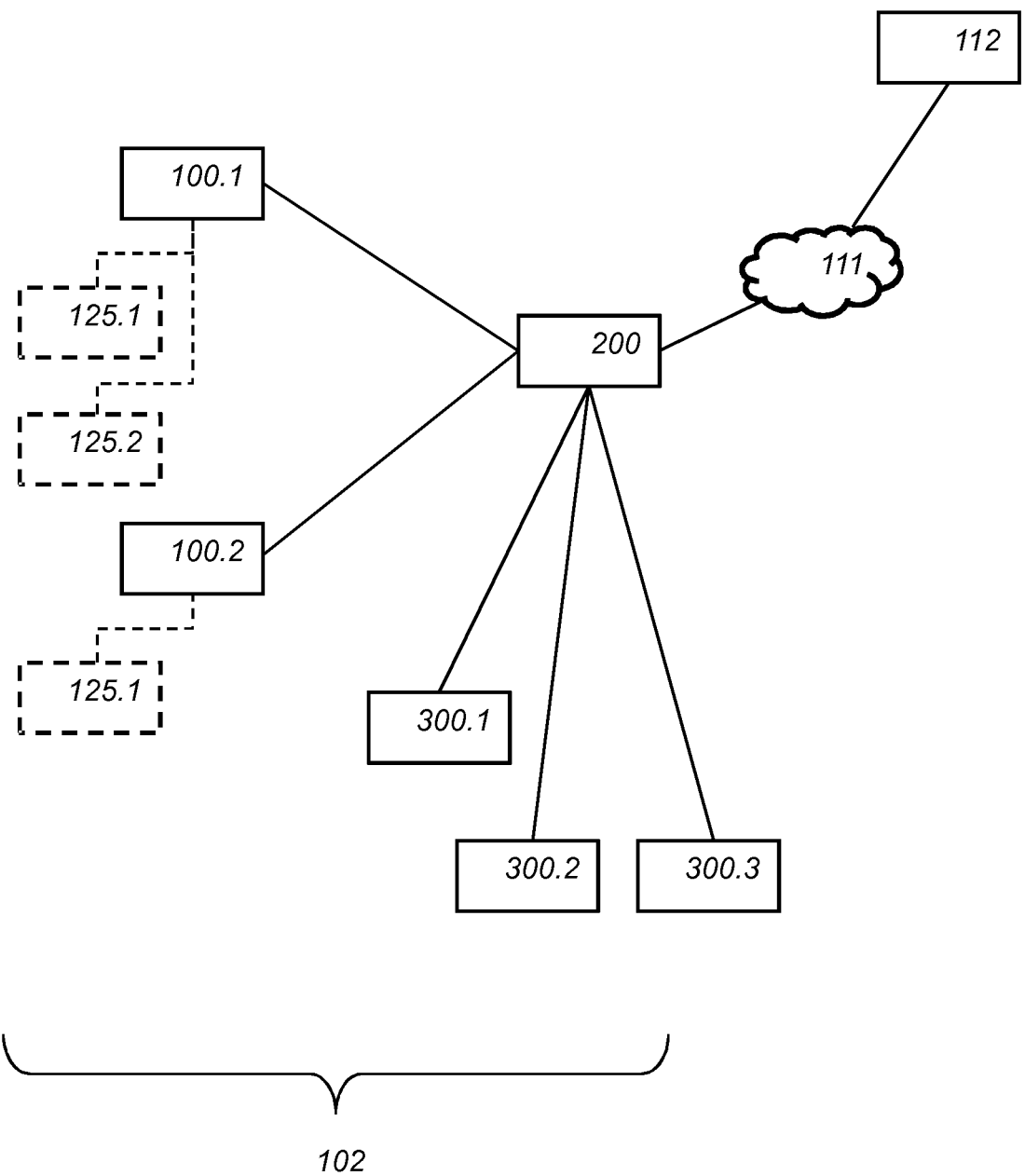

FIG. 1b schematically shows an example of an embodiment of a consumer application system. Shown in FIG. 1b is a home area network 102. Part of HAN 102 is a network controller 200. Network controller 200 is connected to another computer network 111, e.g., the Internet. For example, a server 112 may be connectable through network 111 with network controller 200, and though it with network 102. Part of network 102 are one or more operating device, shown are operating device 100.1 and 100.2. These may be similar to operating device 100. Part of network 102 are one or more network-connected consumer devices, shown are devices 300.1, 300.2, and 300.3. These may be similar to network-connected consumer device 300. Installed on the operating devices is software the implement one or more consumer application units. For example, operating device 100.1 has two consumer application units installed thereon: consumer application units 125.1 and 125.2. For example, these may be used to control devices 300.1 and 300.2. In the embodiment shown, operating device 100.2 has consumer application units 125.1 installed thereon but not consumer application unit 125.2. Network controller 200 may allow both operating devices 100.1 and 100.2 to control device 300.1. Consumer application unit 125.2 could later be installed on operating device 100.2, if desired. Instead of a HAN, a local network may be used.

Returning to FIG. 1a. The consumer application, e.g., software, may implement the consumer application unit 125. Operating device 100 may also support a protective application, i.e., the authentication software, for protecting the communication of the consumer application unit 125. For example, operating device 100 may comprise a memory for storing computer program instructions (not separately shown in FIG. 1a). The computer program instructions comprise a consumer application part, and a protective part. The consumer application part of the computer program instructions implement the consumer application and thus the consumer application unit 125. In an embodiment, the protective part is implemented in two parts: a first protective part and a second protective part, implementing a first protective unit 141 and a second protective unit 142. For example, first protective part 141 of the instructions may implement a first part of the protective application, e.g., a first protective application part. For example, second protective part 142 of the instructions may implement a second part of the protective application, e.g., a second protective application part.

This is not necessary, and the protective part could be implemented in one part.

In an embodiment, the first protective part is configured to run in a user mode and the second protective part is configured to run in a privileged mode. For example, the privileged mode may be a kernel mode. For example, the units 125 and 141 may be configured to run in user mode 121, while unit 142 may be configured to run in a privileged, e.g., kernel, mode 122. The privileged mode, e.g., kernel mode, is privileged with respect to user applications. Thus user applications cannot access the program instructions or data of applications running in the privileged mode.

Figure 2:
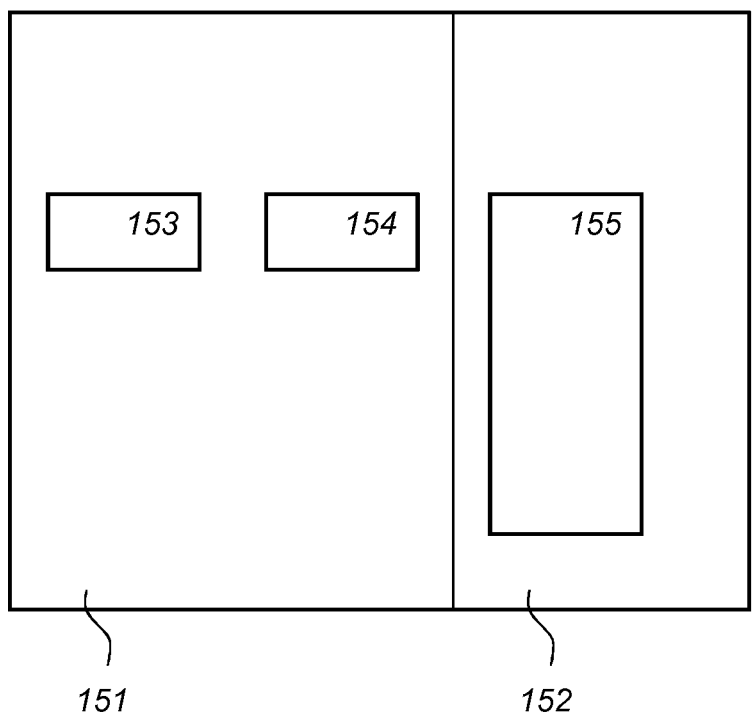

FIG. 2 schematically shows an example of an embodiment of a memory 150. The memory stores consumer application instructions 153, first protective instructions 154, and second protective instructions 155. For example, consumer application instructions 153 and first protective instructions 154 may be stored in a first part of the memory 151, and second protective instructions 155 in a second part of the memory 152. The first part 151 may be used for user mode applications, while the second part 152 may be for privileged applications. In an embodiment, first protective instructions 154 are comprised in first part of the memory 151.

For example, a kernel may report some parts of memory 150, e.g. part 151, to an operating systems so that application can be installed on the operating device and run by an operating system of the operating device. Some other parts, e.g., part 152, may not be reported by the kernel to the operating system. Those parts of the memory may be used to store the kernel itself, to store part or all of the protective software, and/or to store data used by those programs.

Returning to FIG. 1a. Consumer application unit 125 is configured to generate a command message for the network-connected device, and to forward the command message to the protective part of the computer program instructions. For example, the command message may instruct network-connected consumer device 300 to perform some action, e.g., to generate a status report, increase a temperature, switch a burglar alarm to an active state, etc.

Consumer application unit 125 may be configured to forward the command message to the first protective unit 141. For example, the consumer application instructions may comprise instructions to generate the command message and to forward the generated message to be processed by the protective application instructions, in particular instructions of the first protective application. For example, forwarding the message may be performed by calling an application programming interface (API).

The protective application, e.g., the protective part of the instructions is configured to sign the command message with a private key obtained from a key storage 160 of the operating device, and to send the protected command message to the network controller.

For example, the consumer application part is arranged to forward the command message to first protective unit 141. First protective unit 141 is arranged to forward the command message to second protective unit 142. Second protective unit 142 is arranged to sign the command message with the private key. Interestingly, the work of protecting the communication from a consumer application to a network-connected consumer device is split in two parts. A first part may run in user-mode, but a second part in kernel-mode. For example, the second part may have access to the key, and perform the actual signing, while the first part receives the signed command message. In an embodiment, second protective unit 142 comprises a signing unit 145 arranged for signing the command message. First and second unit 141 and 142 may be updated separately. For example, first part 141 may be updated using the regular updating mechanism of application on the operating device. Second part 142 may be updated together with the kernel of the operating device. If the first part 141 is updated a signed hash may be provided to facilitate verification of first part 141 of the hash during execution of first part 141.

First protective unit 141 may also be configured to receive the signed command message from second protective unit 142, and to send it to network-connected consumer device 300, e.g., via network controller 200.

In an embodiment, the protective part is configured to authenticate the user prior to protecting the command message. For example, the authentication may be by password, pin, biometric, etc. In an embodiment, the user authentication is done by the first protective part.

In an embodiment, the protective part also encrypts the command message. For example, the command message may be encrypted with a public key. The public key may be of the network controller or of the network-connected consumer device. In the former case, the command message may be decrypted by the network controller before forwarding the command message; possibly the command message is re-encrypted. For example, the command message may be encrypted with a symmetric key. The symmetric key may be shared with the network controller and/or with the network-connected consumer device. In the former case, the command message may be decrypted by the network controller before forwarding the command message; possibly the command message is re-encrypted.

Messages generated by a consumer application are protected by signing them with a private key of operating device 100. Network controller 200 is arranged to verify the protection of the protected command message and to forward the protected command message to the network-connected consumer device if the protection, e.g., signature and/or encryption, is verified correctly. For example, network controller 200 may comprise an authentication unit 240 arranged to verify the authentication of the command message. If the command message received from operating device 100 does not have a valid authentication, then network controller 200 will not forward the command message to network-connected consumer device 300.

The signing of the signing unit 145 may use a symmetric algorithm, e.g., a MAC algorithm, e.g., HMAC, CBC-MAC, etc., or an asymmetric algorithm. For example, the signing may be an RSA signing, e.g., according to PKCS #1, or an elliptic curve signing, e.g., according to the ECDSA algorithm. Authentication unit 240 uses the corresponding verification algorithm. In case of a symmetric signing algorithm, authentication unit 240 has access to the same key as signing unit 145. In case of an asymmetric signing algorithm, authentication unit 140 does not need access to the signing key, but may instead have access to a verification key.

Not all messages that are sent by operating device 100 through network controller 200 need to be signed or verified. For example, network controller 200 may be configured so that messages that have network-connected consumer device 300 as destination, e.g., as destination address, require a signature, whereas other message may be forwarded without a similar test.

An advantage of system 101 is that multiple consumer applications may be installed on operating device 100, e.g., to control multiple network-connected consumer devices. However, each one of those consumer applications may use the same protective part, or parts to protect the messages. For example, the consumer applications may be arranged to forward the command message to the first protective part, the first protective part is arranged to forward the command message to the second protective part.

The protective application may be protected against unauthorized use in various ways. For example, in an embodiment, the second protective unit 142 may comprise a program verification unit 143. Program verification unit 143 is configured to verify if the first protective unit 141 has been tampered with. This provides additional security. The first protective unit 141 can perform various checks of its own to see if a signing can take place. For example, first protective unit 141 may authenticate a user. For example, first protective unit 141 may monitor for unusual behavior or may be preventively blocked either by the user or by a third-party device. An attacker may wish to circumvent any of these checks. However, if the attacker modifies first protective unit 141, or circumvents first protective unit 141 entirely and tries to access second protective unit 142 directly, this will be blocked by program verification unit 143

For example, program verification unit 143 may be configured to retrieve at least part of the program instructions of the first protective part. For example, because the second protective unit runs in a privileged mode, it is able to retrieve program instructions from the calling program, which runs in user mode, in this case the instructions implementing unit 141. Next the program verification unit 143 verifies if the retrieved instructions have been modified. For example, program verification unit 143 may be configured to compute a hash function over the retrieved program instructions, and obtain a pre-determined hash, e.g., retrieve the pre-determined hash from a hash value storage, and verify that the computed hash equals the retrieved hash before signing the command message. For example, the pre-determined hash may be stored in the second protective unit. For example, the pre-determined hash may be retrieved from the internet, or from first protective unit 141. The pre-determined hash may be signed with an asymmetric signing key, which may be verified by a verification key to which the second protective unit has access. This signing key is different from the signing key, used by the second protective unit to sign command messages. In an embodiment, the first protective part may have been randomized so that different operating devices implementing the same functions of the operating device have different hashes.

An advantage of the verifying the hash after receiving a call from the first protective part 141 is that even modification that took place during execution of the operating device are caught by the second protective part 142.

Second protective unit 142 may have storage to store intermediate data, or to store the key storage, etc. The storage of second protective unit 142 may be memory which is not reported to the operating system of operating device 100.

The private key may be protected in various ways as well. For example, operating device 100 may comprise a key storage 160. Key storage 160 may be implemented in a storage of device 100, e.g., a memory. Beneficial methods to protect a key are provided in WO2004/111752A2. For example, a key may be hidden by storing it in memory which is not reported to the operating system of the operating device. Such memory is available to an application running in a privileged mode, e.g., kernel mode.

For example, key storage may be implemented in the same memory in which the instruction for the second protective unit are stored. The key storage stores the private key in multiple parts 161. The multiple parts need to be combined in a particular way, e.g., concatenated in a particular order. For example, the parts are input to a function $f(x_1, x_2, \ldots, x_n)$ applied in second protective unit 142, in which the $x_i$, are key parts. For example, the function may be a non-commutative function. At least some different permutations of the key parts give a different result for the private key. The parts may be stored in the key storage in a scrambled order. The scrambled order may be different for different implementation of the second protective unit, so that different operating devices have a different ordering of the key parts.

Another way in which the private key or private key parts may be protected, is by encrypting them with a storage key. The encryption may use multiple keys. For example, at least two parts of the private key may be encrypted with a different storage key. The different storage keys may be stored in the second protective part 142. The one or more storage keys may instead be provided by an operating system or kernel of operating device 100. The storage key may depend at least in part on a device metric of the operating device. For example, a system metric source 165 may provide a metric that can be obtained, e.g., observed or measured, by the second protective unit 142. For example, the system metric source 165 may include such variables as internal memory size, screen resolution, etc. Preferably the system metric source 165 is not easily changeable. For example, the private key or private key parts may be encrypted with a storage key or keys. The storage key or keys may be derived from system metrics. Exactly how the storage keys are derived from system metrics may be secret. For example, this deriving may be performed by the second protective part 142. For example, the second protective part 142 may collect the system metrics, and apply a one-way function, e.g., a hash function.

The storage key may also be obtained from the kernel. For example, the kernel may provide support for encrypted storage. For example, the kernel may provide an encryption key. Alternatively, the kernel may provide an interface for encrypted storage.

In case asymmetric keys are used, then the private key has a corresponding public key. In an embodiment, the public/private key pair is generated on the operating device, and the public key is then sent to the network controller 200. After generating the private key at the operating device 100, the operating device 100 proceeds to store the private key, preferably, in a protected manner. For example, in multiple parts and/or encrypted parts and/or encrypted with multiple different storage keys. In an embodiment, a public/private key pair is, instead or also, generated on the network controller 200, and the public key is then sent to the operating device. The network controller may use the same type of secure storage as the operating device.

In an embodiment, the operating device and the network controller each comprise a storage storing a common secret. After generating the public/private key pair, the public key is protected by the common secret before sending it. This has the advantage that the public key does not become accessibly to an attacker of the system. The common secret could be provided by a third party, or by executing an appropriate protocol, e.g., a Diffie-Hellman key exchange.

In the embodiments, of the operating device 100 the first and second protective parts may be combined into a single protective part. The single protective part may, e.g., run in privileged mode, e.g., kernel mode.

Figure 3:
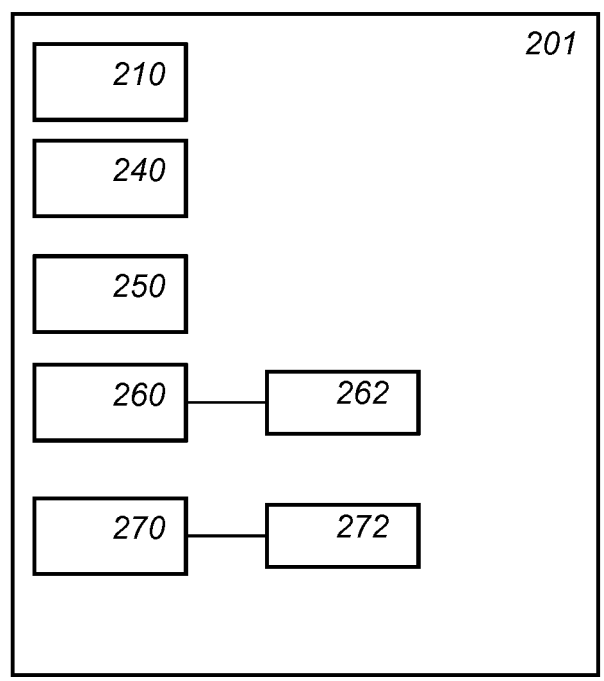

FIG. 3 schematically shows an example of an embodiment of a network controller 201. Network controller 201 can be used with operating device 100, like network controller 200, but network controller 201 has a number of additional, optional, features.

In an embodiment, network controller 201 comprises a signing unit 250. After the authentication of a received protected command message has been verified, the command message may be obtained. For example, a signature may be discarded or removed.

Signing unit 250 is configured to protect the command message to obtain a second protected command message by encrypting the second command message with a public key of the selected network-connected device and/or signing the command message with a private key of the network controller. The newly protected command message is then forwarded to the network-connected consumer device 300.

In other words, after the network controller 201 verified that a particular command message came from the operating device 100, the command message is protected anew by the network controller 200. This means that network-connected consumer device 300 can perform its own verification of the command message without needing to know about the authentication that is provided at the operating device 100.

In an embodiment, network controller 201 comprises an optional traffic profiler 260 and a traffic profiler storage 262. Network-connected device 300 may be configured not only to receive messages from operating device 100, but also to generate a further message. The further message may be intended for the operating device 100 or for a device outside of system 101, e.g. a third party server. This has the risk that, if network-connected device 300 is hacked, it may be used as part of a bot-net to send out unwanted messages, e.g., to the internet possibly in large quantities.

To address this, traffic profiler storage 262 stores a traffic profile of the network-connected device. Traffic profiler 260 is configured to determine that the further message satisfies the traffic profile, and if so forward the further message, e.g., to the operating device, or to a device outside system 101. For example, the traffic profile may comprises rules for messages generated by the network-connected consumer device, said rules being based upon one or more of data format, allowable port usage, data/exchange intervals, horizontal communications, required interaction prior to conducting a TCP/IP exchange.

For example, a rule in the traffic profile may be that no message from network-connected consumer device 300 comprises TCP message, but only UDP messages. If TCP message are received from network-connected consumer device 300, then these may be blocked by traffic profiler 260, based on this rule in the traffic profile in traffic profile storage 262.

For example, in an embodiment the traffic profile may restrict the destination of traffic, e.g., internal or external to the local network, and the volume of frequency of the traffic. For example, in an embodiment related to FIG. 1b. The traffic profile may comprise a table such as the following

| Device | Allowed Destination | Volume |
|---|---|---|
| 100.1 | Any | No restriction |
| 100.2 | Any except 300.2 | No restriction |
| 300.1 | Any | Only 100 messages per hour, or only 100 kB per hour |
| 300.2 | Only 100.1 | None |
| 300.3 | Only internal | None |

The table, or index, may comprise a further column with the public key of the device, if any. For example, devices 100.1 and 100.2 may have protective software installed which sign messages of the consumer applications. The public key can be used to verify the signatures.

In an embodiment, network controller 200 comprises a password generator 270 and a password storage 272. The password storage 272 may comprise a configuration password. For example, the configuration password may be needed to change settings of network controller 200. Initially the configuration password may be set to a default value. Password generator 270 is configured to generate a random string, replace the configuration password with the random string, encrypt the random string, and send the encrypted random string to another device. The other device may be operating device 100, or it may be a further device outside system 101. For example, encrypting the random string may be done with a fixed key which is programmed in password generator 270. In an embodiment, the random string is encrypted with symmetric key, or with an asymmetric key, e.g., the public modem key, a public key of operating device 100, e.g., of first or second protective part.

If later the configuration password is needed, it can be requested. For example, the configuration password may be obtained from the operating device 100. The random string need not be uniformly random. For example, the random string may be a random alphanumeric string.

The devices 100, 200 and 300 may have a user interface, which may include well-known elements such as one or more buttons, a keyboard, display, touch screen, etc. The user interface may be arranged for accommodating user interaction for performing interaction with the consumer application, configuring the network controller, operating the network-connected consumer device, etc.

Storage may be implemented as an electronic memory, say a flash memory, or magnetic memory, say hard disk or the like. The storage may comprise multiple discrete memories together making up the storage. The storage may also be a temporary memory, say a RAM.

Typically, the devices 100, 200 and 300 each comprise a processor, e.g., a CPU or microprocessor (not separately shown in FIG. 1a), which executes appropriate software stored at devices 100, 200 and 300; for example, that software may have been downloaded and/or stored in a corresponding memory, e.g., a volatile memory such as RAM or a non-volatile memory such as Flash (not separately shown). Alternatively, devices 100, 200 and 300 may, in whole or in part, be implemented in programmable logic, e.g., as field-programmable gate array (FPGA). Devices 100, 200 and 300 may be implemented, in whole or in part, as so-called application-specific integrated circuit (ASIC), e.g., an integrated circuit (IC) customized for their particular use. For example, the circuits may be implemented in CMOS, e.g., using a hardware description language such as Verilog, VHDL etc.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only. Units according to an embodiment may be implemented as a circuit.

Figure 4:
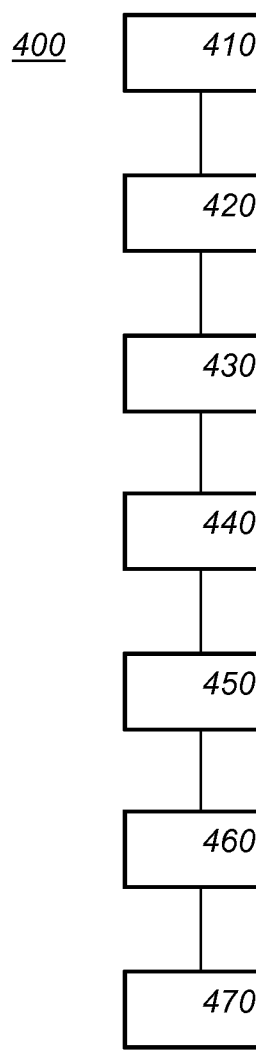

FIG. 4 schematically shows an example of an embodiment of a protection method 400. The protection method 400 is arranged to protect communication between a consumer application, e.g., a consumer application 125, and a network-connected consumer device, e.g., network-connected consumer device 300. Protection method 400 comprises arranging (410) digital communication with a network controller (200) over a digital network, said network controller being arranged to digitally communicate over a digital network with an operating device running the consumer application and with the network-connected consumer device, providing (420) computer program instructions comprising a consumer application part, and a protective part, generating (430) a command message for the network-connected device, and to forward the command message to the protective part of the computer program instructions, protecting (440) the command message by signing the command message with a private key, and sending (450) the protected command message to the network controller, verifying (460) the protection of the protected command message and forwarding (470) the protected command message to the network-connected consumer device.

Figure 5:
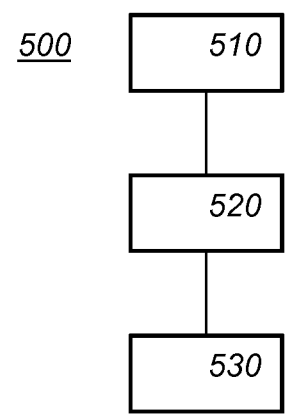

FIG. 5 schematically shows an example of an embodiment of a network method 500. Network method 500 is for use with an operating device, e.g., operating device 100. Network method 500 comprises arranging (510) digital communication with the operating device and a network-connected consumer device, receiving (520) a protected command message from the operating device, verifying (530) the protection of the protected command message and forwarding the command message to the network-connected device.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. Moreover, a given step may not have finished completely before a next step is started.

A method according to an embodiment may be executed using software, which comprises instructions for causing a processor system to perform method 400 or 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to an embodiment may be executed using a bitstream arranged to configure programmable logic, e.g., a field-programmable gate array (FPGA), to perform the method.

It will be appreciated that some embodiments extends to computer programs, particularly computer programs on or in a carrier, adapted for putting the embodiment into practice. The program may be in the form of source code, object code, a code intermediate source, and object code such as partially compiled form, or in any other form suitable for use in the implementation of the method according to an embodiment. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 6A:
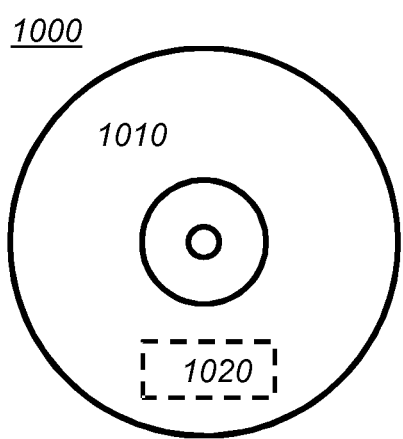

FIG. 6a shows a computer readable medium 1000 having a writable part 1010 comprising a computer program 1020, the computer program 1020 comprising instructions for causing a processor system to perform a protection method or network method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said a protection method or network method.

Figure 6B:
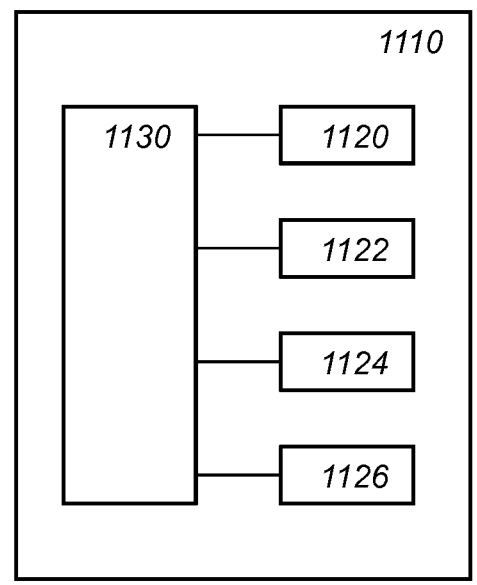

FIG. 6b shows in a schematic representation of a processor system 1140 according to an embodiment of an operating device or network controller. The processor system comprises one or more integrated circuits 1110. The architecture of the one or more integrated circuits 1110 is schematically shown in FIG. 6b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, an operating device or network controller device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex M0. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Embodiments may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. An electronic operating device arranged to protect communication between a consumer application and a network-connected consumer device, the operating device comprising
- a communication interface arranged to digitally communicate with a network controller over a digital network, said network controller being arranged to digitally communicate with the operating device and the network-connected consumer device over the digital network, and
- a memory storing computer program instructions and a processor circuit connected to the memory for executing the computer program instructions, the computer program instructions comprising a consumer application part, and a protective part, the protective part comprising a first protective part, and a second protective part, said first protective part being configured to run in a user mode and the second protective part being configured to run in a privileged mode, wherein
  the consumer application part is arranged to generate a command message for the network-connected consumer device, and to forward the command message to the protective part of the computer program instructions, and
  the protective part is arranged to protect the command message by signing the command message with a private key obtained from a key storage of the operating device, and to send the protected command message to the network controller, the network controller being arranged to verify the protection of the protected command message and to forward the protected command message to the network-connected consumer device.

2. The operating device as in claim 1, wherein
the consumer application part is arranged to forward the command message to the first protective part, the first protective part being arranged to forward the command message to the second protective part, the second protective part being arranged to sign the command message with the private key, wherein the second protective part is arranged to
  retrieve at least part of the program instructions of the first protective part,
  compute a hash function over the retrieved program instructions,
  obtain a pre-determined hash, and
  verify that the computed hash equals the obtained hash before signing the command message.

3. The operating device as in claim 2, wherein the first protective part has been randomized so that different operating devices implementing the same functions of the operating device have different hashes.

4. The operating device as in claim 1, wherein the operating device comprising a key storage, the key storage storing the private key in multiple parts, the second part having access to the key storage, wherein
  at least two parts of the private key are encrypted with a different storage key, and/or
  the order of the multiple parts has been scrambled.

5. The operating device as in claim 1, wherein a storage key depends at least in part on a device metric of the operating device.

6. The operating device as in claim 1, wherein the digital network is configured so that all messages of the operating device and of the network-connected consumer device pass through the network controller.

7. The operating device as in claim 1, wherein the protective part is arranged to encrypt the command message, said encrypting being arranged for decryption by the network controller.

8. The operating device as in claim 1, wherein the protective part is arranged to generate a transaction random, and to send the transaction random associated with the protected command message to the network controller.

9. The operating device as in claim 2, wherein the first protective part is configured to display a private desktop to a user of the operating device, wherein the private desktop is securely separated from other desktops of the operating device and is not accessible from applications in a regular user desktop of the operating device.

10. A network controller for use with an operating device as in claim 1, the network controller comprises
  a communication interface for digital communication with the operating device and the network-connected consumer device,
  a processor circuit configured to
    receive the protected command message over the communication interface of the network controller, and
    verify the protection of the protected command message and to forward the command message to the network-connected consumer device.

11. The network controller as in claim 10, wherein the processor circuit of the network controller is configured to
  obtain from the protected command message the command message,
  protect the command message to obtain a second protected command message by encrypting the second command message with a public key of the selected network-connected consumer device and/or signing the command message with a private key of the network controller, and
  send the second protected command message to the selected network-connected consumer device over the communication interface of the network controller, the network-connected consumer device being configured to receive the second protected command message over the communication interface of the network controller, and to verify the protection of the second protected command message and obtain therefrom the command message.

12. The network controller as in claim 10, wherein the network-connected consumer device is configured to generate a further message, and to send the further message to the network controller, wherein the network controller comprises a
  storage arranged to store a traffic profile of the network-connected consumer device, and wherein the processor circuit of the network controller is configured to
  determine that the further message satisfies the traffic profile, and if so forward the further message.

13. The network controller as in claim 12, wherein the traffic profile comprises rules for messages generated by the network-connected consumer device, said rules being based upon one or more of data format, allowable port usage, data/exchange intervals, horizontal communications, required interaction prior to conducting a TCP/IP exchange.

14. The network controller as in claim 10, wherein the network controller is arranged with a configuration password, the processor circuit of the network controller being configured to
- generate a random string,
- replace the configuration password with the random string, and
- encrypt the random string, and send the encrypted random string to another device.

15. The network controller as in claim 10, wherein a transaction random is received associated with the protected command message, the processor circuit of the network controller being configured to
- verify if a transaction random storage comprises the received transaction random, and if so to block the command message, and if not, add the transaction random to the transaction random storage.

16. A protection method arranged to protect communication between a consumer application and a network-connected consumer device, the protection method comprising
- arranging digital communication with a network controller over a digital network, said network controller being arranged to digitally communicate over a digital network with an operating device running the consumer application and with the network-connected consumer device,
- providing computer program instructions comprising a consumer application part, and a protective part, the protective part comprising a first protective part, and a second protective part, said first protective part being configured to run in a user mode and the second protective part being configured to run in a privileged mode,
- generating a command message for the network-connected consumer device, and to forward the command message to the protective part of the computer program instructions, and
- protecting the command message by signing the command message with a private key, and sending the protected command message to the network controller, said being arranged for verifying the protection of the protected command message and forwarding the protected command message to the network-connected consumer device.

17. A network method for use with an operating device, comprising the method of claim 16, the network method further comprising
- arranging digital communication with the operating device and a network-connected consumer device,
- receiving a protected command message from the operating device, and
- verifying the protection of the protected command message and forwarding the command message to the network-connected consumer device.

18. A non-transitory computer readable medium comprising computer program instructions to protect communication between a consumer application and a network-connected consumer device, the computer program instructions including a consumer application part and a protective part, the protective part comprising a first protective part and a second protective part, said first protective part being configured to run in a user mode and the second protective part being configured to run in a privileged mode, wherein the computer program instructions when executed by a processor system, causes the processor system to:
- arrange digital communication with a network controller over a digital network, said network controller being arranged to digitally communicate over a digital network with an operating device running the consumer application and with the network-connected consumer device,
- generate a command message for the network-connected consumer device and to forward the command message to the protective part of the computer program instructions, and
- protect the command message by signing the command message with a private key and sending the protected command message to the network controller, said being arranged for verifying the protection of the protected command message and forwarding the protected command message to the network-connected consumer device.

* * * * *

UNITED STATES PATENT AND TRADEMARK OFFICE
CERTIFICATE OF CORRECTION

| | |
|---|---|
| PATENT NO. | : 11,552,934 B2 |
| APPLICATION NO. | : 16/955252 |
| DATED | : January 10, 2023 |
| INVENTOR(S) | : Kevin Wendell Dobbins and Scott MacDonald Ward |

It is certified that error appears in the above-identified patent and that said Letters Patent is hereby corrected as shown below:

In the Claims

Claim 16, Column 29, Line 40, "the network controller, said being arranged for verifying the protection" should read "the network controller being arranged for verifying the protection".

Claim 18, Column 30, Line 37, "the network controller, said being arranged for verifying the protection" should read "the network controller being arranged for verifying the protection".

Signed and Sealed this
Twenty-sixth Day of December, 2023

Katherine Kelly Vidal
*Director of the United States Patent and Trademark Office*